Feb. 1, 1972    A. H. DRELICH ET AL    3,639,327
ADHESIVE COMPOSITION

Filed May 27, 1968    3 Sheets-Sheet 1

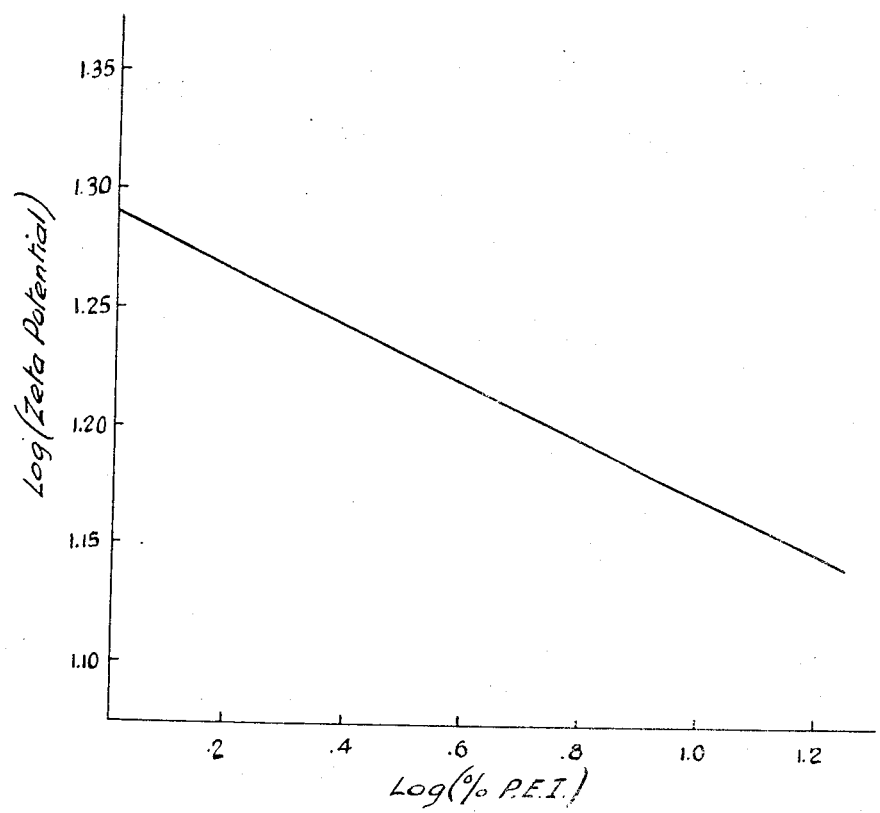

United States Patent Office 3,639,327
Patented Feb. 1, 1972

3,639,327
ADHESIVE COMPOSITION
Arthur H. Drelich, Plainfield, and Patricia M. Condon, East Brunswick, N.J., assignors to Johnson & Johnson
Filed May 27, 1968, Ser. No. 732,454
Int. Cl. C08f 45/24
U.S. Cl. 260—29.6 NR
7 Claims

ABSTRACT OF THE DISCLOSURE

An adhesive system having improved adhesive strength and derived from a colloidal dispersion of a latex adhesive and a cationic material.

---

Polymeric materials have been used as adhesives for many years and, for many uses, have been quite adequate; however, for other uses, they have not been because they lacked sufficient adhesive strength, i.e., the joint established between the polymeric adhesive and the substrate to which it is adhered was not strong enough to resist separation under certain conditions. While this invention does not attempt to improve all polymeric adhesive compositions, it does enhance considerably certain latex adhesive systems.

The instant invention establishes an adhesive system comprising a colloidal dispersion of a negatively charged latex adhesive having a particle size of from about 0.025 micron to about 5 microns and, contained within said dispersion, from about 0.005% to about 5% by weight of a cationic ZP-agent, said agent having lowered the zeta potential of said latex at least about 0.2 millivolt to provide an adhesive system characterized by increased adhesive strength.

As used herein, the term "latex adhesive" is an aqueous dispersion of discrete polymer particles having a particle size of from about 0.025 micron to about 5 microns, and preferably from about 0.05 micron to about 1 micron, where the polymer may be selected from natural or synthetic rubber, vinyl resins, acrylates, condensation polymers and mixtures thereof, has a solids content of from about 15% to about 60% by weight and has an negative surface charge. Examples of such polymers are (a) vinyl-type addition polymers, both resins and elastomers, e.g. polyvinyl acetate, polyvinyl chloride, acrylics, butyl rubber, polyolefins, and (b) polymers formed by condensation and other stepwise mechanisms, e.g. polyamides, polyesters, polymeric Diels-Alder adducts, e.g., butadiene, styrene, and polyurethanes. The solids content of the latex adhesive is preferably from about 30% to about 50% by weight based on the total weight when the latex adhesive is applied to function as an adhesive to bind one surface to another.

The negative surface charge of the individual colloidal particles making up the latex is defined in terms of its zeta potential. This measurement can be accomplished by several means available to the art, e.g. by use of microelectrophoresis with the ultramicroscope. The actual zeta potential may be calculated by the Helmholtz-Smoluchowski equation.

The zeta potential of the latex must be reduced by at least about 0.2 millivolt and preferably 2 millivolts, as measured by the procedure hereinafter described, to establish a meaningful increase in the adhesive strength exhibited by the latex adhesive in the adhesive joint. A number cannot be applied to the measure of the increase in the adhesive strength thereby produced in the latex adhesive, since individual latexes differ in their initial zeta potential and in their initial adhesive strength; therefore, the effect of about an 0.2 millivolt decrease in the zeta potential of the latex will be defined by an increase in the adhesive strength of the latex system which is dependent on the particular latex involved and the amount of that latex in the colloidal solution.

While the latexes utilized in this invention have been defined, there are those that are preferred and they are the polyvinyl acetates, polyvinyl chloride, the polyacrylates, and their copolymers.

The term "ZP-agent" as used herein defines a chemical composition having a positive charge and capable of conveying this cationic charge to the latex adhesive to lower, by at least about 0.2 millivolt, the zeta potential of the negatively charged latex adhesive, and to thus effect an increased adhesive strength potential in the latex adhesive. This increase in the adhesive strength of the adhesive is capable of being measured, as shall be shown hereinafter.

The ZP-agents of this invention are divided into two groups. The first group is composed of nitrogenous, organic polymers such as amines, amides, imines, etc. that vary in chemical structure except for their cationic charge and the fact that they are each nitrogenous. Examples of these are polyethylenimine and cationic starch.

The second group is defined as being composed of cationic inorganic substances having a valence of three or greater. An example is a thorium compound where the thorium has a valence of plus four. Examples of this second group are thorium nitrate, other soluble thorium salts, aluminum nitrate and other soluble aluminum salts.

The ZP-agent utilized herein may have a widely varying positive charge; however, it is readily understood that the invention will require a larger quantity of a ZP-agent that has a small positive charge, in order to effect a lowering of the zeta potential. Thus, economics dictate the use of a ZP-agent bearing a significant positive charge.

The improved adhesive system of this invention is provided by the method which comprises adding from about 0.005%, and preferably at least about 0.02%, to about 5% by wegiht of a ZP-agent to a negatively charged latex adhesive colloidal dispersion, said ZP-agent lowering the zeta potential of said latex at least about 0.2 millivolt to provide increased adhesive strength in said system.

The ZP-agent is added slowly with vigorous stirring to the colloidal latex adhesive dispersion in order to avoid local instability and coagulation. As was stated earlier, the zeta potential of the latex adhesive dispersion must be lowered by at least 0.2 millivolt in order to effect some meaningful increase in the adhesive strength exhibited by this latex adhesive as it is applied to a substrate and dried or allowed to dry.

Ideally, sufficient ZP-agent is added to the latex adhesive as to bring the adhesive near its coagulation point. However, this is dependent on the time intervening between preparation, i.e., the lowering of the zeta potential of the latex adhesive via this invention, and actual use, since if the adhesive does not have to stand for a period of time, sufficient ZP-agent may be added to bring the latex adhesive near to its point of coagulation, or to its point of instability against coagulation; whereas, if the latex were not to be used for a lengthy period of time, this point of instability could not be approached. However, it is to be understood that the danger of coagulation occurring will vary depending on the specific latex utilized and the strength of the cationic charge exhibited by the ZP-agent. Also, if the adhesive is to be stored for a certain period, or for an indefinite period, the amount that its zeta potential is lowered must be reviewed in light of the tendency of the adhesive system to coagulate before its application to the adherend intended.

The amount of ZP-agent utilized herein to significantly lower the zeta potential of the latex adhesive is dependent on the strength of the cationic charge exhibited by the ZP-agent. If the ZP-agent was to have such a weak charge that large amounts of it were necessary to perform its intended function in this invention, there may well be so much added as to undesirably influence or otherwise contribute to properties of the latex adhesive. Thus, not only for reasons of economics, but for purely practical reasons, a ZP-agent having a strong cationic charge is sought.

The lowering of the zeta potential of the latex adhesive improves the adhesive joint that it will establish with an adherend and this is measured in terms of the improvement in the strength of the adhesive bond established between the adhesive, having had its zeta potential value lowered, and the substrate to which it is adhered.

In order to describe the invention in greater detail, reference is made to the accompanying drawings wherein:

FIG. 1 is a plan view of test apparatus;

FIGS. 1a, 1b and 1c are cross-sectional views of test adhesives and their adhesion to a substrate;

Figure 4:
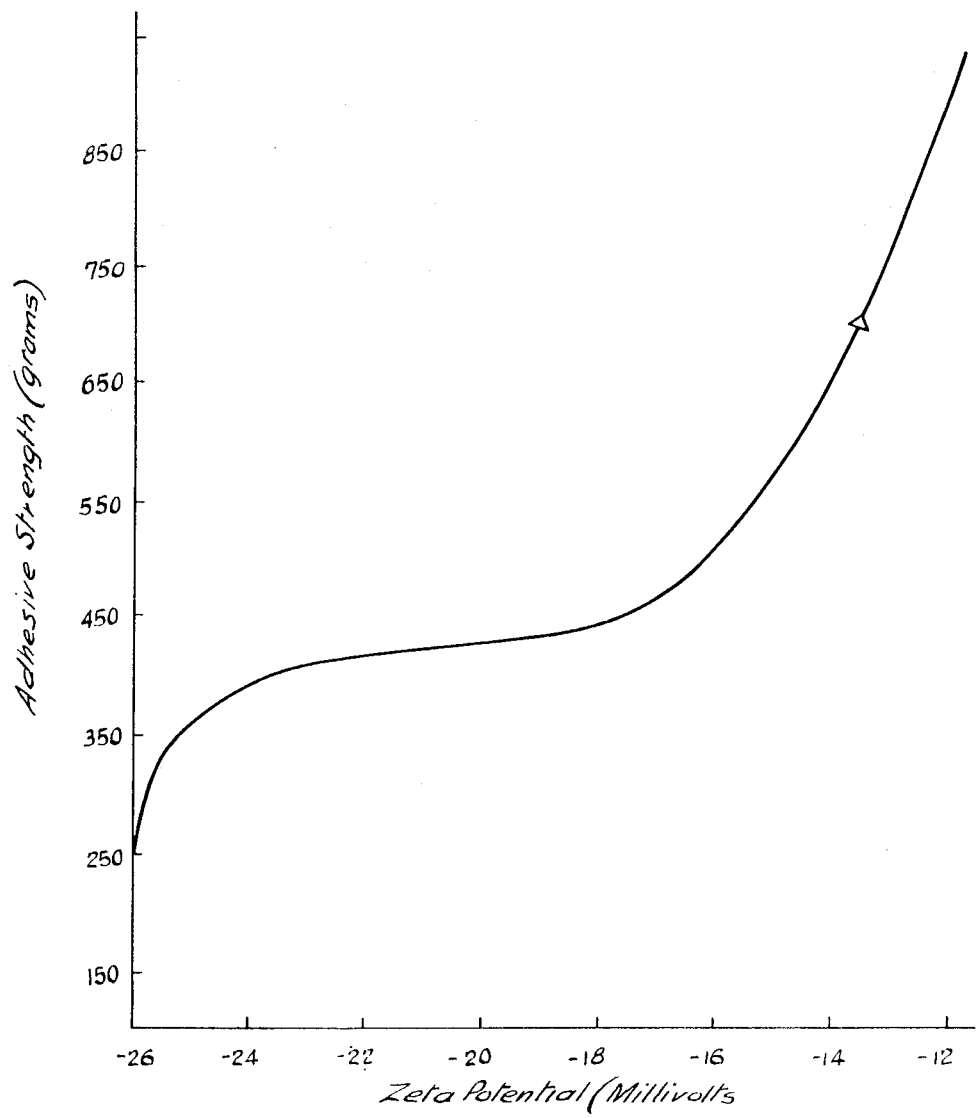

FIG. 2 graphically depicts the relationship of zeta potential (adhesive) to the percent cationic ZP-agent present in the adhesive;

FIG. 3 graphically depicts the relationship of the log of the zeta potential of the adhesive to the log of the percent cationic ZP-agent present in the adhesive; and FIG. 4 graphically depicts the zeta potential of the adhesive versus the adhesive strength of the adhesive.

The increase in the adhesion of an adhesive treated following the procedure of the instant invention is measured utilizing the Peel Test which is readily explained with reference to FIG. 1, which schematically depicts the test set-up. Here the adhesive 1, adhered to a substrate 2, is fastened via a clip 3 to a string 4 which passes over two pulleys 5 and 6 and is attached to a tray 7. The tray 7 is depicted holding a weight 8 which has sufficient weight to pull the length 9 of the adhesive film 1 from the substrate 2.

The peel strength of the joint formed between the adhesive 1 and the substrate 2 is taken herein as the measure of adhesion and the peel strength is defined as the force necessary to peel the adhesive from a substrate at an angle of 90°, at a constant peel rate of at least 0.2 centimeter per minute. Adhesion strength is defined as the peel strength of an adhesive which peeled at the rate of 1.0 centimeter per minute.

The adhesive is pulled consistently perpendicularly from the substrate 2 since the pulleys 5 and 6 are both attached to means (not shown) which allow them to slide freely simultaneously from side to side, and in that way the angle between the adhesive film 1 and the substrate will always be substantially 90°.

The force on the adhesive joint was increased by given increments until the adhesive peeled from the substrate at a constant rate of 1 cm./min. The rate of peel may be determined by measuring the upward rate of movement of the clip 3 with a stopwatch and recording the distance the clip 3 travels during successive predetermined intervals.

Utilizing the above-given test procedure, it is shown that the instant invention improves the adhesive strength of an adhesive by at least about 50% and in many instances up to 400% or more.

In the peel test described above, a distinction is made between three types of sample (adhesive film) failure. This is explained with reference to FIGS. 1a–c. In the first of these, i.e., FIG. 1a true "adhesion" is defined by an adhesive film 10 which peels completely from the substrate 11 in a way such that separation of the adhesive film 10 occurs at the originally adhesive-adhered boundary 14. "Cohesive separation" is shown in FIG. 1b where separation of the adhesive film 10 occurs within the adhesive film, itself, leaving a continuous adhesive layer 12 on the substrate 11. "Mixed separation" is depicted in FIG. 1c where separation of the adhesive film occurs partially within the adhesive layer 10 and partially at the adhesive-adhered boundary, leaving a discontinuous film 13 of adhesive on the substrate 11.

FIG. 2 depicts graphically the relationship between the zeta potential of the adhesive of this invention, which contains a ZP-agent, i.e., polyethylenimine in this instance, and the percent by weight of ZP-agent present in the adhesive. The values are those obtained via Example I.

There is a decrease in zeta potential with the addition of as little as 0.005% by weight polyethylenimine.

FIG. 3 depicts graphically the log of the zeta potential values of FIG. 2 versus the log of the percent polyethylenimine values of FIG. 2 to provide a straight line function.

The adhesive strength increase with the lowering of the zeta potential of an adhesive by the addition of ZP-agent via this invention is graphically depicted in FIG. 4. Note that a small decrease in zeta potential by the addition of a small amount of ZP-agent to the adhesive, results in a large increase in adhesive strength.

While this invention has been described in terms of an adhesive; it is applicable to substances that adhere to substrates such as paints, inks and other coating compositions. Thus, with the addition of pigment to the system of this invention, a paint, ink or another coating composition is formed and its adhesion to a substrate is dramatically increased. Once again, however, the base adhesive is a "latex adhesive," as defined earlier, and the paint, ink, etc. so described has as its base this latex adhesive.

The following examples are illustrative of specific embodiments of this invention.

EXAMPLE I

Adhesive samples are prepared utilizing as the base latex adhesive a polyethyl acrylate aqueous emulsion having a solids content of 46%. The ZP-agent is polyethylenimine and is added to the polyethyl acrylate resin as a 1% aqueous solution, dropwise, using a magnetic stirrer. Adhesive samples are prepared having concentrations of from 0.01% through 0.12% polyethylenimine by weight and zeta potential measurements are made utilizing an ultramicroscope with a mercury lamp as an illuminator. The ultramicroscope used is one fashioned after the Siedentopf and Zsigmondy design, Ann. Physik (4), 10, 1, 1903; however, a super-pressure Hg vapor lamp, 100 w, i.e., model HB OW/2, by Osram, mounted in a AO lamp housing is substituted for the carbon arc light and is operated with a model P–110–D Gates transformer. The microscope was manufactured by American Optical and is fitted with a calibrated fine adjustment. The objective is 20×, N.A. 0.40 achromatic, manufactured by Nikon. The eyepiece is 20× compensating, fitted with a grid-pattern reticle, Arthur H. Thomas Company 6837 Eyepiece Micrometer Disc. Microscope magnification is, therefore, approximately 400×.

The electrophoresis cell is patterned after the Arthur H. Thomas Cataphoresis cell A, catalogue #2873A, except that it was machined from a polymethyl methacrylate block. The top and bottom faces, as well as the side through which the light beam enters, are of glass. The cell is approximately rectangular, dimensions 15 mm. (wide), 25 mm. (long), 1.1 mm. (deep). The glass was cemented to the methacrylate by a special epoxy cement, i.e., #K–25090 A and B (Kontes Glass Co.). The auxiliary glassware for introducing colloidal dispersions into the cell and electrode arrangement is a modification of the cell described by Rock, R. M. and Burbank, N. D., Jr., at the 20th Purdue Industrial Waste Conference, Purdue University, May 4, 1965.

Direct current is provided by a model 21 Electrophoresis Power Supply. The rate of travel of the colloidal particles is measured with a seconds timer, type 6335

(Cramer Controls) fitted with a manually operated microswitch.

For use in this ultramicroscope, a resin sample is diluted 1:25,000 with tap water at 22° C. The mobility recorded for each sample is an average of three successive trials measuring ten particles each. The cell is completely flushed between trials. The zeta potential of the given series of samples varying in polyethylenimine concentrations is measured in order to determine the relationship between the concentration of the cationic additive, i.e., the ZP-agent, and the zeta potential of the latex adhesive itself.

Glass plates are the substrates to which the adhesives are adhered. They are cleaned by washing with detergent and water, rinsing with distilled water and acetone, and drying at 88° C. for ten minutes. The surface is cooled at room temperature for ten minutes before testing.

The adhesive samples are each cast on a glass substrate using a film caster. The adhesive films cast are each 0.03 inch thick and each adhesive film is dried for fifteen minutes at 88° C. and then cooled at room temperature for ten minutes. Strips of cellophane tape are put on each of the adhesive films to serve as a backing and to insure that the polyethyl acrylate will not stretch or rip during testing. Each of the samples is then cured at 140° C. for fifteen minutes and cooled for two hours at room temperature before testing. Test samples one-half inch wide are cut from each film. The adhesion of the polyethyl acrylate film samples to the substrate is measured by the peel test described earlier and depicted via FIG. 1. One control sample containing no polyethylenimine is utilized and is designated Sample A. Samples B through F contain polyethylenimine. Test results are given in Table I and the plot of the zeta potential determined for each of Samples A through F is depicted via FIG. 2.

TABLE I

[Measurements of zeta potential of Samples A-F using the ultramicroscope defined above. The current through the electrophoresis cell is 74±1 microampere]

| Sample (percent P.E.I.* in resin) | Time (sec. division)** | Field strength (v./cm.) | Electrophoretic mobility ($\mu$ sec./ volt/cm.) | Zeta potential (millivolts) |
| --- | --- | --- | --- | --- |
| A—0.00 (control) | 3.0 | 5.5 | 1.64 | −23.2 |
| B—0.01 | 3.6 | 5.6 | 1.45 | −20.4 |
| C—0.015 | 3.7 | 5.8 | 1.26 | −17.8 |
| D—0.030 | 4.0 | 5.6 | 1.21 | −17.1 |
| E—0.060 | 4.2 | 5.6 | 1.13 | −16.0 |
| F—0.120 | 4.7 | 5.6 | 1.01 | −14.2 |

*Polyethylenimine.
**1 division=27.1 microns ($\mu$).

As stated, the plot of the zeta potential versus the percent polyethylenimine of each of Samples A through F of Table I is depicted graphically via FIG. 2, and this graphic representation suggests a logarithmic relationship between the zeta potential of the adhesive and the percent of polyethylenimine additive in the resin sample. The graph (FIG. 3) of log (zeta potential) versus log (percent polyethylenimine) in each sample is a straight line. Therefore, the general equation can be written:

$$\log z = \log km_2 (\log (\text{percent P.E.I}))$$

$$z = k (\text{percent P.E.I.})^{n_z}$$

where:

$z$ = zeta potential (millivolts)

$k$ is a constant (log $k$ is the value of log $z$ when the percent polyethylenimine is zero), and $m_2$ is the slope of the line of log (zeta potential) versus log (percent polyethylenimine)

The above test procedure is repeated substituting cationic starch for the polyethylenimine as the ZP-agent, and similar results are obtained.

EXAMPLE II

Following the procedure given in Example I and once again using polyethyl acrylate as the base latex adhesive and polyethylenimine as the ZP-agent, a control sample and six other samples containing varying amounts of polyethylenimine are prepared and adhered to a glass substrate. Provision is made for an adhesive film thickness of 0.024 inch in each instance and, utilizing the ultramicroscope defined earlier, the zeta potential for each sample is determined as is shown in Table II.

TABLE II

| Sample (percent P.E.I.* in resin) | Time (sec./division)** | Field strength (v./cm.) | Electrophoretic mobility ($\mu$ sec./ volt/cm.) | Zeta potential (millivolts) |
| --- | --- | --- | --- | --- |
| A—0.00 (control) | 4.3 | 2.9 | 1.84 | −26.0 |
| B—0.005 | 4.4 | 2.9 | 1.83 | −25.8 |
| C—0.025 | 2.7 | 5.6 | 1.58 | −25.1 |
| D—0.035 | 4.7 | 2.9 | 1.70 | −24.9 |
| E—0.05 | 4.1 | 5.8 | 1.14 | −16.0 |
| F—0.066 | 4.1 | 5.6 | 1.15 | −16.2 |
| G—0.10 | 5.8 | 5.4 | 0.86 | −12.2 |

*Polyethylenimine.
**1 division=27.1 microns ($\mu$).

Utilizing the peel test defined in FIG. 1 and used in Example I, the adhesive strength of the joint formed between each of the acrylate adhesive polymer test samples A–G and glass is determined and the results are given in Table III and depicted graphically via FIG. 4, which shows that with a decrease in the zeta potential of the adhesive polymer due to the addition of a ZP-agent thereto, the adhesive strength is increased dramatically.

TABLE III

| Sample (Percent P.E.I. in resin) | Zeta potential (millivolts) | Adhesive strength (grams) |
| --- | --- | --- |
| A—0.00 | −26.0 | 207 |
| B—0.005 | −25.8 | 320 |
| C—0.025 | −25.1 | 325 |
| D—0.035 | −24.0 | 393 |
| E—0.05 | −16.0 | 490 |
| F—0.066 | −16.2 | 471 |
| G—0.10 | −12.2 | 884 |

A marked increase in adhesion is brought about with the addition of a very small amount of ZP-agent. A concentration of 0.005% polyethylenimine which lowers the zeta potential of the adhesive only 0.2 mv., increases the adhesive strength of the resin to a glass substrate by 115 grams, i.e., from 207 grams to 320 grams. After the initial sharp increase in adhesion with the addition of small amounts of ZP-agent, the increase in adhesion is seen to be substantially gradual with the addition of increasing amounts of ZP-agent until sufficient ZP-agent is added to reduce the zeta potential of the adhesive to about −17; whereupon, a sharp increase in adhesion again takes place.

Similar results are obtained if a nylon substrate is substituted for the glass.

Other substrates suitable as adherends in the instant invention are metals such as aluminum, steel, natural occurring surfaces such as wood and other synthetic surfaces composed of compositions such as a polyester or a polyolefin.

While this invention has been described with reference to adhesives generally and specific reference has been made to its use in connection with certain latex adhesive base paints, it may also be utilized in certain ink compositions where once again the base composition is a latex adhesive.

The invention has been described in connection with its preferred embodiments but many modifications thereof are anticipated without a departure from the inventive concept which is limited only by the scope of the appended claims.

What is claimed is:

1. An improved adhesive system comprising a colloidal dispersion of a negatively charged latex adhesive having a particle size of from about 0.025 micron to about 5 microns and, dispersed within said dispersion, from about 0.005% to about 0.12% by weight of polyethylene imine as a cationic ZP-agent, said latex adhesive being a vinyl-type addition polymer, and said agent being capable of lowering the zeta potential of said latex at least about 0.2 millivolts but insufficient to bring the latex adhesive to its point of coagulation to provide an adhesive system characterized by increased adhesive strength.

2. The adhesive system of claim 1 wherein said system has a solids content of from about 15% to about 60% by weight.

3. The system of claim 1 wherein at least about 0.02% of said ZP-agent is present.

4. The system of claim 1 wherein said zeta potential is lowered at least about 2 millivolts.

5. A method of providing an improved latex adhesive system which comprises adding from about 0.005% to about 0.12% by weight of polyethylene imine as a ZP-agent to a negatively charged latex adhesive colloidal dispersion, said latex adhesive being a vinyl-type addition polymer, and said ZP-agent being capable of lowering the zeta potential of said latex at least about 0.2 millivolt but insufficient to bring the latex adhesive to its point of coagulation to provide increased adhesive strength in said system.

6. A method of providing an improved latex adhesive system as defined in claim 5 wherein the polyethylene imine is added slowly and with vigorous stirring to bring the latex adhesive near its coagulation point without creating local instability and coagulation.

7. A method of providing an improved latex adhesive system as defined in claim 5 wherein the zeta potential is lowered at least about 2 millivolts.

References Cited

UNITED STATES PATENTS

| 3,057,811 | 10/1962 | Trachtenburg et al. | 260—29.6 |
| 3,122,447 | 2/1964 | Sexsmith | 260—899 |
| 3,223,751 | 12/1965 | Sellet | 260—29.6 |

FOREIGN PATENTS

| 692,233 | 8/1964 | Canada | 260—29.6 |

JOHN C. BLEUTGE, Primary Examiner

U.S. Cl. X.R.

156—327, 328, 331; 260—3, 9 R, 17.4 ST, 29.2 N, 29.6 N, 29.7 NR, 29.7 N, 858, 860, 874, 888, 897 R, 899, 901

PO-1050
(5/69)

UNITED STATES PATENT OFFICE
CERTIFICATE OF CORRECTION

Patent No. 3,639,327          Dated February 1, 1972

Inventor(s) Arthur H. Drelich et al

It is certified that error appears in the above-identified patent and that said Letters Patent are hereby corrected as shown below:

In Col. 1, line 51, "50 %" should read -- 55% --.

In Col. 2, line 47, "by at least 0.2" should read -- by at least about 0.2 --.

In Col. 6, Table II, line 19, "-24.9" should read -- -24.0 --.

Signed and sealed this 11th day of July 1972.

(SEAL)
Attest:

EDWARD M. FLETCHER, JR.      ROBERT GOTTSCHALK
Attesting Officer               Commissioner of Patents